United States Patent [19]

Rub

[11] Patent Number: 4,908,721
[45] Date of Patent: Mar. 13, 1990

[54] IMPROVED DECODER

[75] Inventor: Bernardo Rub, Shrewsbury, Mass.

[73] Assignee: Digital Equipment Corporation, Maynard, Mass.

[21] Appl. No.: 193,347

[22] Filed: May 12, 1988

[51] Int. Cl.$^4$ .......................... G11B 5/09; H03M 7/04
[52] U.S. Cl. .......................................... 360/40; 341/95
[58] Field of Search ............... 360/40, 46, 48; 341/95, 341/106, 100, 101

[56] References Cited

U.S. PATENT DOCUMENTS

| 4,496,934 | 1/1985 | Furukawa | 341/106 |
|---|---|---|---|
| 4,502,036 | 2/1985 | Furukawa | 360/40 |
| 4,549,167 | 10/1985 | Kato et al. | 360/40 |
| 4,553,131 | 11/1985 | Endoh | 341/95 |
| 4,598,267 | 7/1986 | Fukuda | 341/106 |
| 4,672,362 | 6/1987 | Furukawa et al. | 341/95 |

Primary Examiner—Vincent P. Canney
Attorney, Agent, or Firm—Nutter, McClennen & Fish

[57] ABSTRACT

A data decoding system includes a data retrieval device which retrieves encoded data from a mass-storage device and transmits the data to a serial-to-parallel shift register. The shift register, operating at the data transfer rate, converts the encoded data to a parallel stream of bit-pairs. The bit-pairs are then transmitted, over parallel lines, to a second shift register which is operating at one-half the data transfer rate. The second shift register stores a sufficient number of the bit-pairs to constitute a byte of binary data when decoded. Once enough bit-pairs are stored, a ROM, operating at a rate which is slower than the data transfer rate, decodes the information to form a byte of binary data. The system utilizes a data retrieval system with a high data transfer rate and processing circuitry with a reduced bandwidth requirement to produce decoded data at a rate which is comparable to the data transfer rate.

8 Claims, 1 Drawing Sheet

IMPROVED DECODER

CROSS REFERENCES TO RELATED APPLICATIONS

The following are related applications: the U.S patent application entitled "Data Decoding Circuit Including Phase-Locked Loop" by Michael Leis, Russel Brown, Elmer Simmons, Bernardo Rub and Michael Muchnik and identified U.S. Ser. No. 01/115,238, which is hereby incorporated herein by reference; and the U.S. Patent application entitled "High Efficiency Disk Format and Synchronization System" by Michael Leis, Bruce Leshay, Michael Muchnik, Satish Rage, Charles Michael Riggle and Lih-Jyh Weng and identified by U.S. Ser. No. 07/193,090.

FIELD OF THE INVENTION

This invention relates generally to the field of mass storage devices and, more particularly, to a method of transferring data from a disk drive.

BACKGROUND OF THE INVENTION

A disk drive is a device for storing computer data which can be retrieved at another time. Generally, it comprises a rapidly revolving disk mounted beneath a movable recording head. In a recording mode, data is transferred onto the disk by the recording head as the rotating disk surface moves under the head. The disk surface is coated with a special material which reproduces and stores the data signals coming from the head. Typically, the head can move incrementally over the surface of the disk in a radial direction. By advancing radially in this manner, it is able to lay down concentric tracks of recorded data on the surface of the disk, thereby using an appreciable portion of the disk surface for data storage. In a reading mode, the head merely senses the previously recorded data stored on the disk as the disk surface passes under the head. Just as when the head records the tracks of data, it also accesses the different tracks by advancing incrementally across the disk.

Information is stored on the surface of the disk as bits of data, that is, as 1's and 0's. Because of the nature of the storage medium, however, normal binary data is often stored in accordance with a conversion code. In the case of a magnetic storage medium, for example, one such code is referred to as a 3-for-2 code. That is, normal binary data is divided into two-bit groupings of data, each of which is then represented by a three bit code. The circuitry which prepares the normal binary data for recording onto the disk surface and the circuitry which processes the retrieved data for use elsewhere in the computer system possess the capability of respectively, coding and decoding the data according to the 3-for-2 code.

Generally, the retrieved data is initially handled in the form in which it is retrieved from the disk, i.e. as a serial stream of bits. Thus, the decoding circuitry and the circuitry which assembles the normal binary data into bytes for use elsewhere in the computer system receives its input in serial form.

Along with advances in technology, both the rotating speed of the disk and the stored data densities have increased dramatically. In other words, the rate at which data can be retrieved from the disk has also increased dramatically, requiring correspondingly higher clock rates. As a consequence, the circuitry which subsequently processes the retrieved data must have considerably higher bandwidths to handle the increased data rates. This requirement drives up both the cost and the complexity of the required circuitry.

SUMMARY OF THE INVENTION

The invention provides a new and improved method of handling data retrieved from a mass storage device such as a disk drive. Without any significant compromise in the rate of data transfer, the method reduces the bandwidth requirements of circuitry which subsequently processes the retrieved data, thereby reducing both the cost and complexity of such circuitry.

In accordance with the invention, a serial-to-parallel shift register receives a serial stream of bits retrieved from a mass storage device and converts it to a parallel stream of bit-pairs. The parallel stream of bit-pairs are then transmitted over parallel lines to a second shift register which receives and temporarily stores the bit-pairs. The second shift register is of sufficient size to store enough bit-pairs, i.e. a segment of data, to represent a byte of normal binary data. When the shift register has received and stored the segment, a ROM decodes the segment into normal binary data. The system then waits until the shift register has accumulated a new segment of data which represents the next byte of normal binary data. At that time, the ROM decodes the new segment.

BRIEF DESCRIPTION OF THE DRAWINGS

The invention is pointed out with particularity in the appended claims. The above, and further, advantages and aspects of this invention may be understood by referring to the following detailed description taken in conjunction with the accompanying drawings, in which:

DETAILED DESCRIPTION OF AN ILLUSTRATIVE EMBODIMENT

Figure 1:
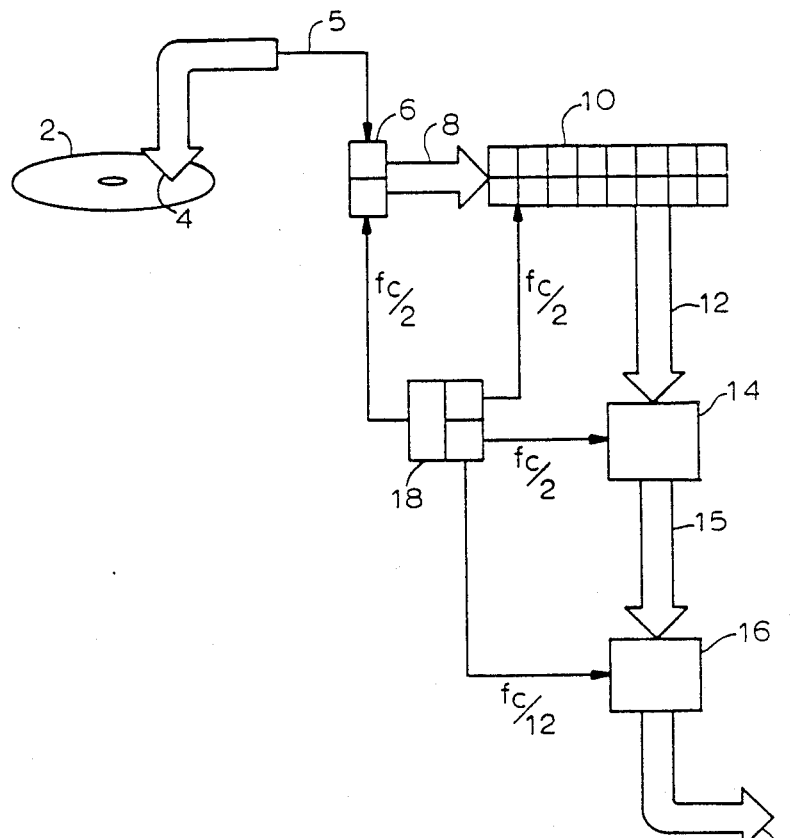
FIG. 1 depicts a block diagram of a system which embodies the invention.

As illustrated in FIG. 1, a storage device with which the invention may be used comprises a rotating disk 2, on which information in the form of bits is stored, and a read/write head 4 which reads the information from the disk 1. The information may be stored on the disk 2 in coded form. In this embodiment, the information represents normal binary data that has been coded in accordance with a 3-for-2 code. That is, the normal binary data is divided into two bit sequences, each of which is converted to a three-bit group. This conversion generates an expanded sequence of bits which is 50% longer than the original sequence of normal binary data. The expanded sequence of bits is recorded onto the disk 2 as the stored information.

In accordance with the invention, the head 4 reads the information from the disk 2 and generates a bit stream 5 which is sent to a serial-to-parallel shift register 6. The shift register 6 converts the incoming bit stream 5 into strings of bits which it sends out as parallel data 8. In the embodiment described herein, each string is a bit-pair which is sent out over two parallel lines.

A second shift register 10 receives the parallel data 8 generated by the serial-to-parallel shift register 6. Preferably, the second shift register 10 is of sufficient size to hold a segment of data, which equals at least the number of groups necessary to yield a byte of normal binary data when decoded. Thus, for the 3-for-2 coded data, the segment size equals 6 bit-pairs of new data plus three bits of data (contained in two bit-pairs) from a previous segment, which are necessary for decoding 3-for-2 coded data.

The data which is passing through the shift register 10 is periodically decoded by a ROM 14 which decodes the data and generates a parallel output of the decoded data. Each time the ROM 14 receives a new segment of data, i.e. a segment representing the next byte of the normal binary data, a clock 18 pulse causes the decoded segment 15 to transfer into a byte register 20 where it is available as decoded information from the disk.

The rate and synchronization of the clock 18 are determined in part by the disk 2. That is, the rate at which the head 4 reads the bits off of the disk 2 establishes a general clock rate $f_c$. The clock, in turn, provides other clock signals which control the timing and rate of operation of the serial-to-parallel shift register 6, the second shift register 10, the ROM 14 and the byte register 16. Since the serial-to-parallel shift register 6 converts the bit stream to parallel data 8 consisting of bit-pairs, both shift registers 6 and 10 need transfer information at only a rate equal to $f_c/2$. Similarly, since the byte register 16 need only receive successive segments of data, it need receive new information at only a rate of $f_c/12$. Thus, an important advantage of this invention is that it significantly reduces the required clock rates and bandwidths for this and related circuitry.

Although the described embodiment uses 3-for-2 coded data and strings that are bit-pairs, no such limitations are implied with regard top the scope of the invention. Different codes and larger strings certainly fall within the scope of the invention.

Having thus described illustrative embodiments of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. Accordingly, the foregoing discussion is intended to be illustrative only, and not limiting; the invention is limited and defined only by the following claims and equivalents thereto.

What is claimed as new and desired to be secured by Letters Patent of the United States is:

1. A decoder for decoding data which is in the form of code words, said decoder comprising:
   A. a p-bit shift register for receiving encoded bits;
   B. means for shifting the encoded bits from said p-bit shift register each time said shift register receives p bits;
   C. a second shift register consisting of a predetermined number of p-bit stages connected to receive a predetermined number of the bits shifted from said p-bit shift register by said shifting means, said second shift register including at least q stages, with the stages together being capable of storing a number of bits corresponding to one or more code words;
   D. decoding means for receiving signals corresponding to the bits stored in said second shift register and providing in response thereto corresponding decoded data; and
   E. means for supplying said signals to said decoding means each time said second shift register receives a predetermined number of bits from said p-bit shift register.

2. The decoder of claim 1, wherein said means for supplying to said decoding means signals corresponding to the bits stored in said second shift register supplies the signals each time said second shift register has received a number of bits corresponding to the code words associated with a byte of data.

3. The decoder of claim 2, wherein said second shift register further stores a predetermined number of bits of encoded data received before the bits corresponding to the code words associated with the byte of data.

4. The decoder of claim 3, wherein said decoding means includes a look-up table.

5. A system for decoding data which is stored in a storage device in the form of code words, said decoding system comprising:
   A. means for retrieving data from said storage device and producing a stream of bits corresponding to the stored data;
   B. a p-bit shift register for receiving the stream of encoded bits;
   C. shifting means for shifting the encoded bits from said p-bit shift register each time the shift register receives p-bits;
   D. a second shift register consisting of a predetermined number of p-bit stages connected to receive a predetermined number of the bits shifted from said p-bit shift register by said shifting means, said second shift register including at least q stages, with the q stages together being capable of storing a number of bits corresponding to one or more code words;
   E. decoding means for receiving signals corresponding to the bits stored in said second shift register and providing in response thereto corresponding decoded data; and
   F. means for supplying said signals to said decoding means each time said second shift register receives a predetermined number of bits from said p-bit shift register.

6. The decoding system of claim 5, wherein said means for supplying to said decoding means signals corresponding to the bits stored in said second shift register supplies the signals each time said second shift register has received a number of bits corresponding to a byte of data.

7. The decoding system of claim 6, wherein said second shift register further stores a predetermined number of bits of encoded data received before the bits corresponding to the code words associated with the byte of data.

8. The decoder of claim 7, wherein said decoding means include a look-up table.

* * * * *